(12) United States Patent  
MacDonald (10) Patent No.: US 11,156,200 B2  
(45) Date of Patent: Oct. 26, 2021

(54) TETHERED BALLAST SYSTEMS FOR POINT ABSORBING WAVE ENERGY CONVERTERS AND METHOD OF USE THEREOF

(71) Applicant: THE UNIVERSITY OF MASSACHUSETTS, Boston, MA (US)

(72) Inventor: Daniel G. MacDonald, Mashpee, MA (US)

(73) Assignee: THE UNIVERSITY OF MASSACHUSETTS, Boston, MA (US)

( * ) Notice: Subject to any disclaimer, the term of this patent is extended or adjusted under 35 U.S.C. 154(b) by 0 days.

(21) Appl. No.: 16/060,618

(22) PCT Filed: Dec. 9, 2016

(86) PCT No.: PCT/US2016/065840  
§ 371 (c)(1),  
(2) Date: Jun. 8, 2018

(87) PCT Pub. No.: WO2017/100582  
PCT Pub. Date: Jun. 15, 2017

(65) Prior Publication Data  
US 2019/0010915 A1 Jan. 10, 2019

Related U.S. Application Data

(60) Provisional application No. 62/266,217, filed on Dec. 11, 2015.

(51) Int. Cl.  
*F03B 13/20* (2006.01)

(52) U.S. Cl.  
CPC .......... *F03B 13/20* (2013.01); *F05B 2270/20* (2013.01); *F05B 2270/808* (2013.01); *Y02E 10/30* (2013.01)

(58) Field of Classification Search  
CPC .............. F03B 13/20; F05B 2270/20; F05B 2270/808; Y02E 10/32; Y02E 10/38  
See application file for complete search history.

(56) References Cited

U.S. PATENT DOCUMENTS 3,986,471 A * 10/1976 Haselton ............. B63B 35/4413  
114/265  
5,770,893 A * 6/1998 Youlton ................ F03B 13/142  
290/42

(Continued)

FOREIGN PATENT DOCUMENTS

CN         105332851      2/2016  
WO      2016120599 A1    8/2016

OTHER PUBLICATIONS

Adam C Brown, Jim Thomson, Heave Plate Dynamics for a Point Absorbing Wave Energy Converter, Proceedings of the 3rd Marine Energy Technology Symposium, METS2015, Apr. 27-29, 2015.

(Continued)

*Primary Examiner* — Joseph Ortega  
(74) *Attorney, Agent, or Firm* — Barlow, Josephs & Holmes, Ltd.; Stephen Holmes (57) ABSTRACT

Point absorbing wave energy converters that do not require a rigid structure, are easy to deploy and are economically viable for a variety of deployments are disclosed herein below. The system includes a point absorber wave energy converter and a flexible component and ballast combination, where the flexible component and ballast combination includes a ballast subsystem and a flexible linear component extending from the point absorber wave energy converter to the ballast subsystem and operatively connected at one end to the ballast subsystem and at another end to the point absorber wave energy converter. The flexible component and ballast combination configured to provide a strong drag (Continued)

force when moving upward in a water column and a weak drag force when sinking in the water column.

20 Claims, 9 Drawing Sheets

(56) References Cited

U.S. PATENT DOCUMENTS

| | | | | |
|---|---|---|---|---|
| 6,392,314 | B1* | 5/2002 | Dick | F03B 13/148 |
| | | | | 290/53 |
| 7,834,475 | B1* | 11/2010 | Costas | F03B 13/144 |
| | | | | 290/53 |
| 7,956,479 | B1* | 6/2011 | Bergman | F03B 13/187 |
| | | | | 290/53 |
| 2007/0089409 | A1* | 4/2007 | Serrano Molina | F03B 13/1885 |
| | | | | 60/504 |
| 2011/0067641 | A1* | 3/2011 | Kithil | A01K 61/10 |
| | | | | 119/215 |
| 2012/0032444 | A1* | 2/2012 | Burton | F03B 13/145 |
| | | | | 290/53 |
| 2017/0145984 | A1* | 5/2017 | Matthews | B01D 61/025 |
| 2017/0363058 | A1* | 12/2017 | Etherington | F03B 13/20 |

OTHER PUBLICATIONS

K. Rhinefrank, J. Prudell, A. Schacher, Development and Characterization of a Novel Direct Drive Rotary Wave Energy Point Absorber, 2009 MTS-IEEE Oceans Conference Proceedings, Nov. 2009.

International Search Report and the Written Opinion for International Application No. PCT/US16/65840 dated Feb. 24, 2017.

* cited by examiner

TETHERED BALLAST SYSTEMS FOR POINT ABSORBING WAVE ENERGY CONVERTERS AND METHOD OF USE THEREOF

CROSS-REFERENCE TO RELATED APPLICATIONS

This application is a U.S. national stage application under 35 U.S.C. 371 of co-pending International Application No. PCT/US16/65840 filed on Dec. 9, 2016, which in turn claims priority to U.S. Provisional Application No. 62/266,217 filed on Dec. 11, 2015, the contents of which are incorporated by reference herein in their entireties for all purposes.

BACKGROUND

These teachings relate generally to point absorbing wave energy converters, and, more particularly, to tethered ballast systems for point absorbing wave energy converters and method of use thereof.

A variety of technologies have been proposed to capture energy from ocean waves. Wave energy conversion technology exists today primarily in the research and development stage, and the state of the technology is commonly considered to be one to two decades behind the development of wind energy. Although wave energy research has been ongoing for the past several decades, primarily in the United Kingdom, wave energy research has lagged significantly behind wind energy due to funding and other political constraints. At the present time, there are no commercially operating wave energy facilities in the world, with the exception of the Pelamis wave energy converter (WEC), which has had limited commercial scale implementation off the coast of Portugal.

There are many approaches to wave energy conversion currently being tested in research facilities around the world. In general, these can be separated into several broad classes of devices:

Oscillating Water Columns—these devices utilize an enclosed box with its bottom open to the ocean. Water entering the box associated with the crest of the wave pushes air out through a small conduit, which is used to drive a turbine producing electricity. As the wave recedes, air is drawn into the box through the same (or a separate) conduit, again driving a turbine to produce electricity.

Overtopping Devices—these devices allow incoming waves to break over the top edge of the device leaving water trapped in a small reservoir. As the water drains, it turns a turbine, creating electricity.

Point Absorbers—these are moored devices, or buoys, that move up and down on the water surface. There are several methods of converting the up and down motion of the point absorber to electricity, but all point absorbers work by exploiting the motion of the wave relative to a fixed, or minimally moving, reference frame. In some cases, the point absorber might be attached to a rigid structure, such as a pier or breakwater in the coastal zone, resulting in relative motion between the wave and the fixed infrastructure. In open waters, a point absorber must operate by exploiting the relative motion between ocean surfaces and relatively calm deeper waters. Motion associated with a wave decreases exponentially away from the surface, with a layer of no motion generally reached at a depth equal to approximately one half the horizontal wavelength.

Oscillating Wave Surge Converters—these can be thought of us submerged flappers that move back and forth as a wave passes. This flapping motion is then converted to electricity through a variety of methods. Sometimes the motion is used to pump seawater to shore where the electrical generating process takes place.

Submerged Pressure Differential Devices similar to the surge converters, these devices use pressure differences on the seafloor as a wave passes to pump seawater which can then be used to drive a turbine.

Attenuators—these devices float at the surface with a number of joints. As the device flexes due to surface wave action, pistons within the joints drive high pressure oil through hydraulic motors which then drive turbines to produce electricity. The Pelamis system, operating off the coast of Portugal, is an example of attenuator technology.

Because there is not yet a proven technology, or technologies, for converting wave energy to electricity, a variety of patents exist for different wave energy converter designs. In particular, there are a number of disclosures for point absorber systems using a rigid spar, which penetrates from the surface (or near surface) to calmer waters at depth to provide ballast for the device, and a fixed reference frame for the wave induced motion (e.g. Montgomery, U.S. Pat. No. 7,535,117 B2; Hon, US 20130008158 A1; Bull et al U.S. Pat. No. 7,877,994 B2). Given that the extinction depth of wave motion is approximately equal to half the wavelength of the wave, typical ocean waves of 50 to 100 m or more would require a spar device to penetrate at least 25 m. This is typically accomplished for most offshore point absorbers by the construction of a rigid spar, with some sort of heave plate on the bottom, which is ballasted to penetrate to a sufficient depth, allowing the top portion of the device to move up and down with the wave against a relatively fixed support. This design typically requires a rigid steel structure that is structurally designed to withstand the torque and other forces that the ocean waves will place on it, and often will weigh several tons in addition to being 10s of meters long. This makes deployment of these devices difficult, and only economically viable for very large energy producing devices.

There is therefore a need to provide designs that do not require a rigid structure and are easier to deploy.

It is a further need to provide a design that is economically viable for a variety of deployments.

BRIEF SUMMARY

Point absorbing wave energy converters that do not require a rigid structure, are easy to deploy and are economically viable for a variety of deployments are disclosed herein below.

These teachings describe methods and systems for harnessing the relative motion using a low cost and easily deployable tethered ballast system. These teachings could benefit many different point absorber designs.

In one or more embodiments, the system of these teachings includes a point absorber wave energy converter and a flexible component and ballast combination, where the flexible component and ballast combination includes a ballast subsystem and a flexible linear component extending from the point absorber wave energy converter to the ballast subsystem and operatively connected at one end to the ballast subsystem and at another end to the point absorber wave energy converter. The flexible component and ballast combination configured to provide a strong drag force when moving upward in a water column and a weak drag force when sinking in the water column, in order to keep the flexible component under tension during the majority of the wave cycle.

In one instance, the ballast subsystem includes a structure substantially parallel to a midplane of the point absorber wave energy converter, where the structure includes a number of openings, each one of the number of openings disposed such that fluid can flow from below a lower portion of the structure towards the point absorber wave energy converter and from above an upper portion of the structure towards the lower portion of the structure, and a number of check valves. Each one of the number of check valves is configured to allow fluid flow between below the lower portion of the structure and above the upper portion of the structure when the structure is moving downward in the water column and to substantially prevent fluid flow between below the lower portion of the structure and above the upper portion of the structure when the structure is moving upwards in the water column.

In one embodiment, the number of check valves are implemented by a number of covering plates; each covering plate configured to be disposed inside one opening from the number of openings and operatively attached off-center inside the opening with a movable joint. Motion stops for each covering plate configured to position each covering plate to allow fluid flow between below the lower portion of the structure and above the upper portion of the structure when the structure is moving downward in the water column and to substantially prevent fluid flow between below the lower portion of the structure and above the upper portion of the structure when the structure is moving upwards in the water column.

Other embodiments of the system of these teachings are detailed below.

One or more embodiments of the method of these teachings for assembling and using the system of these teachings are also detailed below.

For a better understanding of the present teachings, together with other and further needs thereof, reference is made to the accompanying drawings and detailed description and its scope will be pointed out in the appended claims.

DETAILED DESCRIPTION

Point absorbing wave energy converters that do not require a rigid structure, are easy to deploy and are economically viable for a variety of deployments are disclosed herein below.

The following detailed description presents the currently contemplated modes of carrying out the invention. The description is not to be taken in a limiting sense, but is made merely for the purpose of illustrating the general principles of the invention.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." The term "about" is understood in light of the technology embodied herein.

In one or more embodiments, the system of these teachings includes a point absorber wave energy converter and a flexible component and ballast combination, where the flexible component and ballast combination includes a ballast subsystem and a flexible linear component extending from the point absorber wave energy converter to the ballast subsystem and operatively connected at one end to the ballast subsystem and at another end to the point absorber wave energy converter. The flexible component and ballast combination configured to provide a strong drag force when moving upward in a water column and a weak drag force when sinking in the water column, in order to keep the flexible component under tension during the majority of the wave cycle.

Current point absorber technologies use a rigid spar, which penetrates from the surface to calmer waters at depth to provide ballast for the device, and a fixed reference frame for the wave induced motion. Given that the extinction depth of wave motion is approximately equal to half the wavelength of the wave, typical ocean waves of 50 to 100 m wavelength or more would require spar penetration on the order of at least 25 m. The spar must be designed to withstand the torque and other forces that ocean waves will exert on it, and will often weigh several tons in order to weather the extreme conditions that can be present in ocean environments with significant wave activity.

The system of these teachings replaces the rigid spar with a simple, lightweight design, essentially consisting of a flexible line, or chain, running from the point absorber on the surface to an engineered ballast system at the bottom of the line, suspended at some depth below the point absorber device. The ballast and line subsystem is specifically designed to provide minimal drag while descending through the water column and maximal drag while moving upward, allowing the line to remain constantly in tension and overcoming the obvious limitations of a tethered system, which would typically fail when placed into compression. In addition to operational advantages, the advantages of such a system during extreme events are significant. The use of a dynamic system that can lock the ballast in low drag mode, or, alternatively, retrieve the ballast by spooling the tether into a housing below the power take-off unit will decouple the wave energy converter (WEC) from deeper waters and drastically decrease potentially destructive loading on the WEC structure.

In these teachings, the line/weight assembly is designed such that it provides a strong drag force when moving upward in the water column and very little drag force when sinking as shown in FIGS. 1a-1d. In the midst of a wave field, the point absorber at the surface would position itself vertically at the level of the wave trough by virtue of the fast sinking weight. From this position, the point absorber could exploit the upward motion of the wave, because the central shaft of the device would be held in place by the high drag force of the weight/line assembly, while a separate buoy could move with the wave, resulting in relative motion. On the way down, the shaft remains in a nearly static position, allowing the buoy to return to its original position as the water level recedes to the wave trough. In some embodiments, power would only be harvested on the upstroke, leaving the buoyant portion of the shaft assembly to counteract only the gravitational force of the descending buoy. As the wave field diminishes, the point absorber would slowly return to the undisturbed water level.

On the downstroke, the drag force should be small enough so that the ballast device descends through the water column at a rate comparable to, or at the least within about 25% of the vertical motion of the PTO mechanism at, or near, the surface. The phase lag between the component at the surface and the ballast device should be as small as possible, and no more than about one quarter of the wave period.

FIGS. 1a-1d show conceptual operation of the tethered ballast point absorber system, shown as a wave moves right to left, with sequential panels moving left to right. At (a) the device is at rest in calm seas, and no drag is induced by the ballast system. As a wave approaches (b), the ballast system provides minimal drag as the entire system drops with the sea surface, eventually positioning itself in the wave trough. As the device climbs a crest (c), maximal drag provided by the ballast system maintains the base of the unit at its prior elevation, while the buoy moves upward with the wave, creating relative motion. As the wave field grows and troughs deepen (d), the device will always descend to the minimal trough elevation due to reduced ballast drag when moving downward.

As shown in FIGS. 1a-1d, in one embodiment, the system of these teachings for wave energy conversion includes a point absorber wave energy converter 15 and a flexible component and ballast combination 25. The flexible component and ballast combination 25 includes a ballast subsystem 45 and a flexible linear component 35 extending from the point absorber wave energy converter 15 to the ballast subsystem 45 and operatively connected at one end to the ballast subsystem and at another end to the point absorber wave energy converter.

In addition to operational advantages, the tethered ballast system can improve survivability of the WEC during extreme events. By design, the tethered system of these teachings provides low drag associated with downward motion. By capitalizing on the multiple drag modes, the tethered ballast system essentially can allow the system to decouple from the ambient and relatively motionless, water at depth during extreme events by locking into the low drag mode for all motion. Furthermore, due to the tethered design, the ballast system could also be retracted to the surface by automatically spooling the tether into a housing on the underside of the power take off unit. The entire WEC would then be protected within a benign form factor, allowing it to ride out the extreme weather at the surface until conditions warrant redeployment and a return to power generation.

One aspect of these teachings is the design of the tethered ballast system to provide significant drag when moving up and minimal drag when moving down, in order to maintain the flexible line in tension. In addition, the buoyancy of the shaft assembly and the weight/buoyancy of the power drive buoy require careful engineering to ensure that the device operates as intended, namely that downward motion of the device associated with a dropping sea surface (i.e., the "backside" of a wave) is fast and closely follows the motion of the sea surface, while upward motion is much slower than the rising sea surface associated with an oncoming wave. The effect of providing maximal drag in one direction and minimal drag in the opposite direction could be accomplished by a variety of different methods.

In one instance, the ballast subsystem includes a structure 50 substantially parallel to a midplane of the point absorber wave energy converter 15 and generally horizontal, where the structure 50 includes a number of openings 55 each one of the number of openings disposed such that fluid can flow from below a lower portion of the structure 50 towards the point absorber wave energy converter and from above an upper portion of the structure towards the lower portion of the structure, and a number of check valves 65 (hinged plates). (Substantially parallel, substantially perpendicular and generally horizontal, as used herein refers to the structure being within +/−22° of the stated condition.) In one instance, the structure 50 further includes vertical walls 58 substantially perpendicular to the substantially horizontal structure 50. Each one of the number of check valves 65 is configured to allow fluid flow between below the lower portion of the structure and above the upper portion of the structure when the structure is moving downward in the water column and to substantially prevents fluid flow between below the lower portion of the structure and above the upper portion of the structure when the structure is moving upwards in the water column, in order to keep the flexible component under tension during the majority of the wave cycle.

Figure 1A:
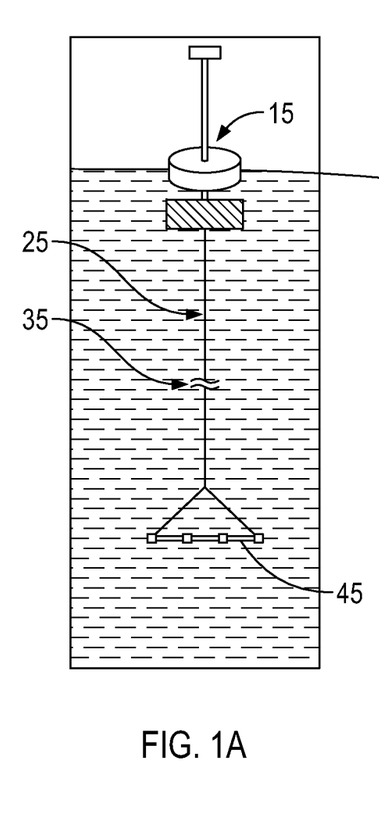
FIGS. 1a-1d show conceptual operation of the tethered ballast point absorber system of these teachings.
Figure 1B:
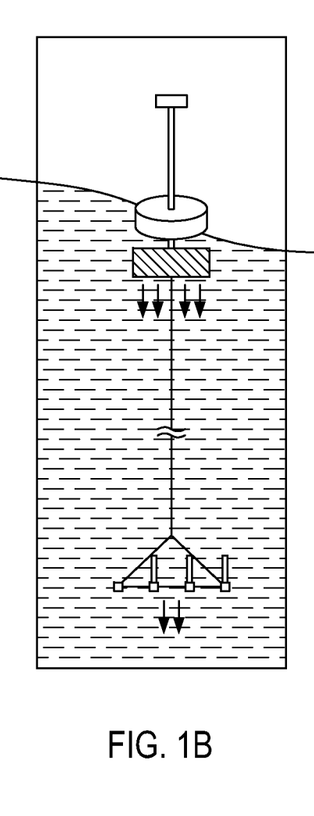
Figure 1C:
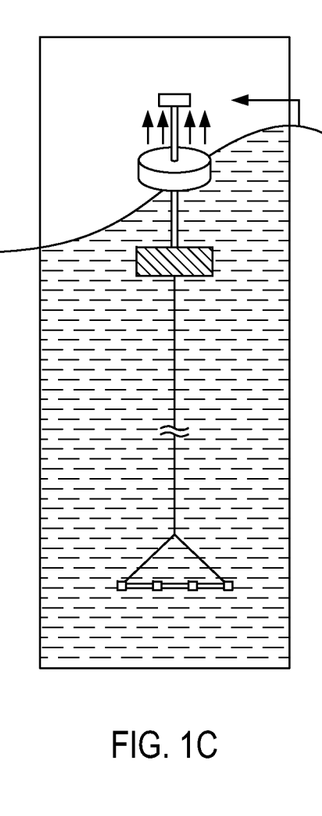
Figure 1D:
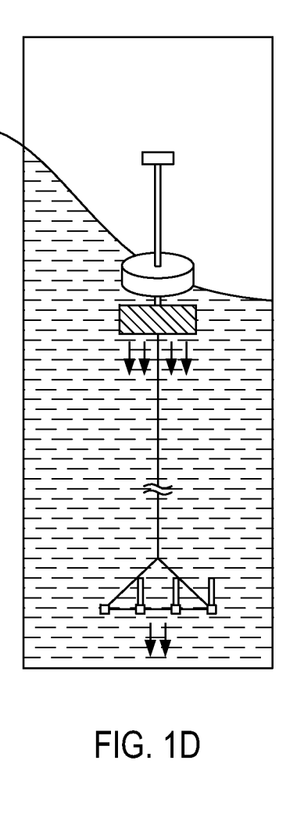
Figure 2A:
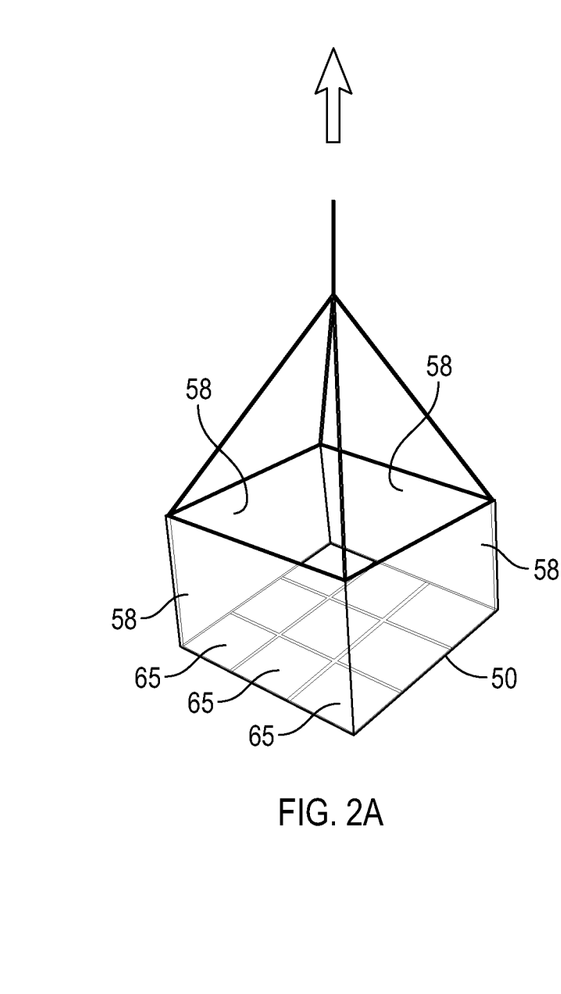
FIGS. 2a-2b shows a schematic of a ballast system design of these teachings.
Figure 2B:
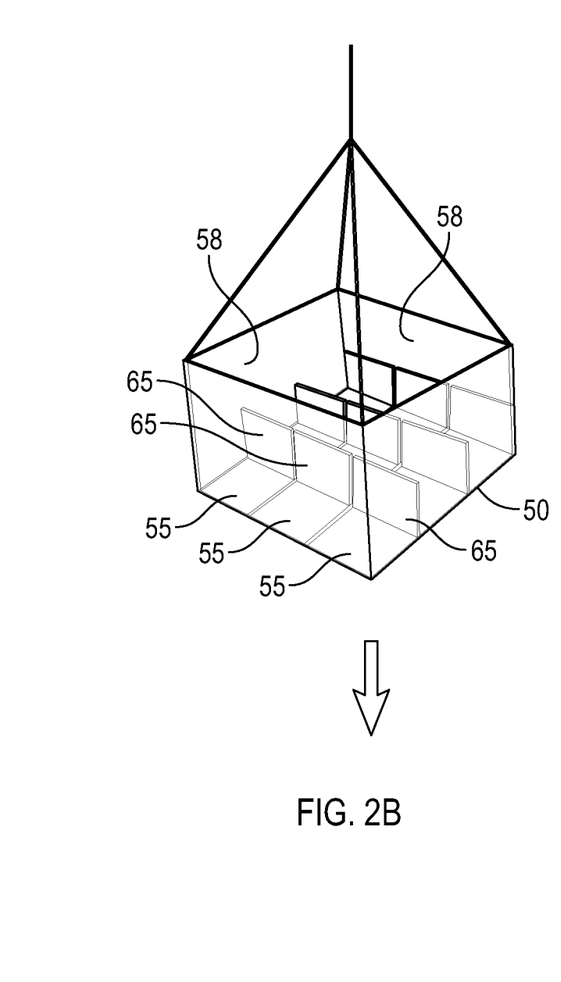
Figure 3A:
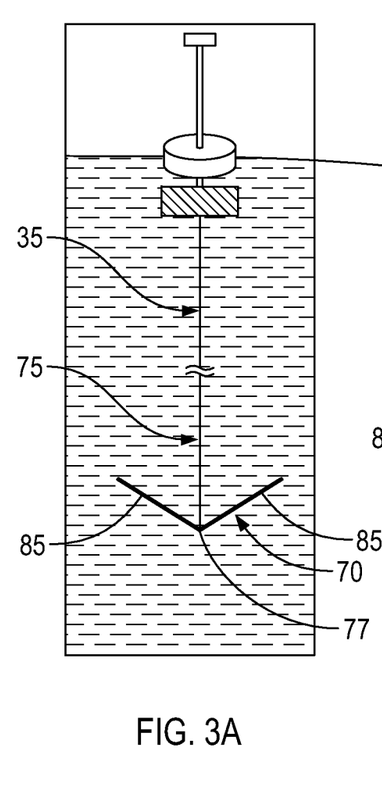
FIGS. 3A-3D shows a schematic of another ballast system design of these teachings.
Figure 3B:
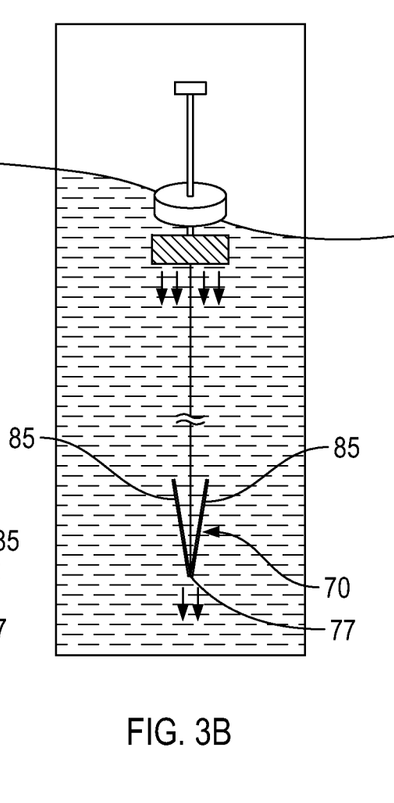
Figure 3C:
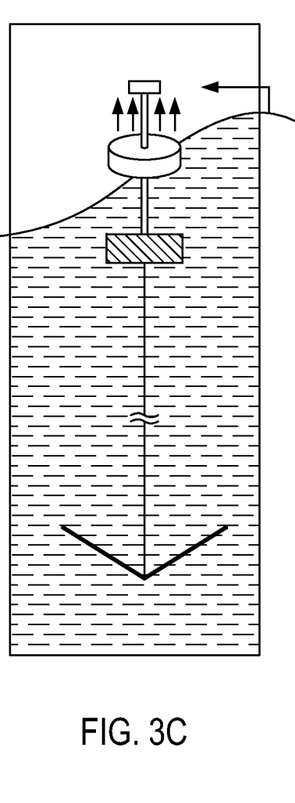
Figure 3D:
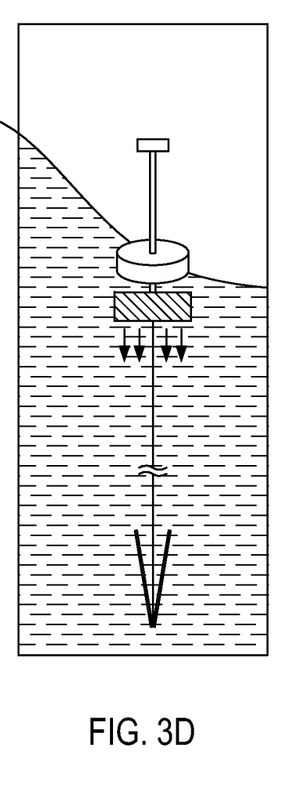

The walls 58 of the structure 50, as identified in the FIGS. 2a-2b by the rectangular perpendicular walls can allow more fluid to be captured by the closing plates 65 (which could be positioned at the bottom, top, or anywhere in between). The shape of the structure need not be a rectangular prism. In some instances, a long and narrow cylindrical structure might be advantageous. The point is to capture a large amount of fluid within the boundaries of the device during upward movement. A structure which is collapsible could be advantageous for deployment.

Figure 5:
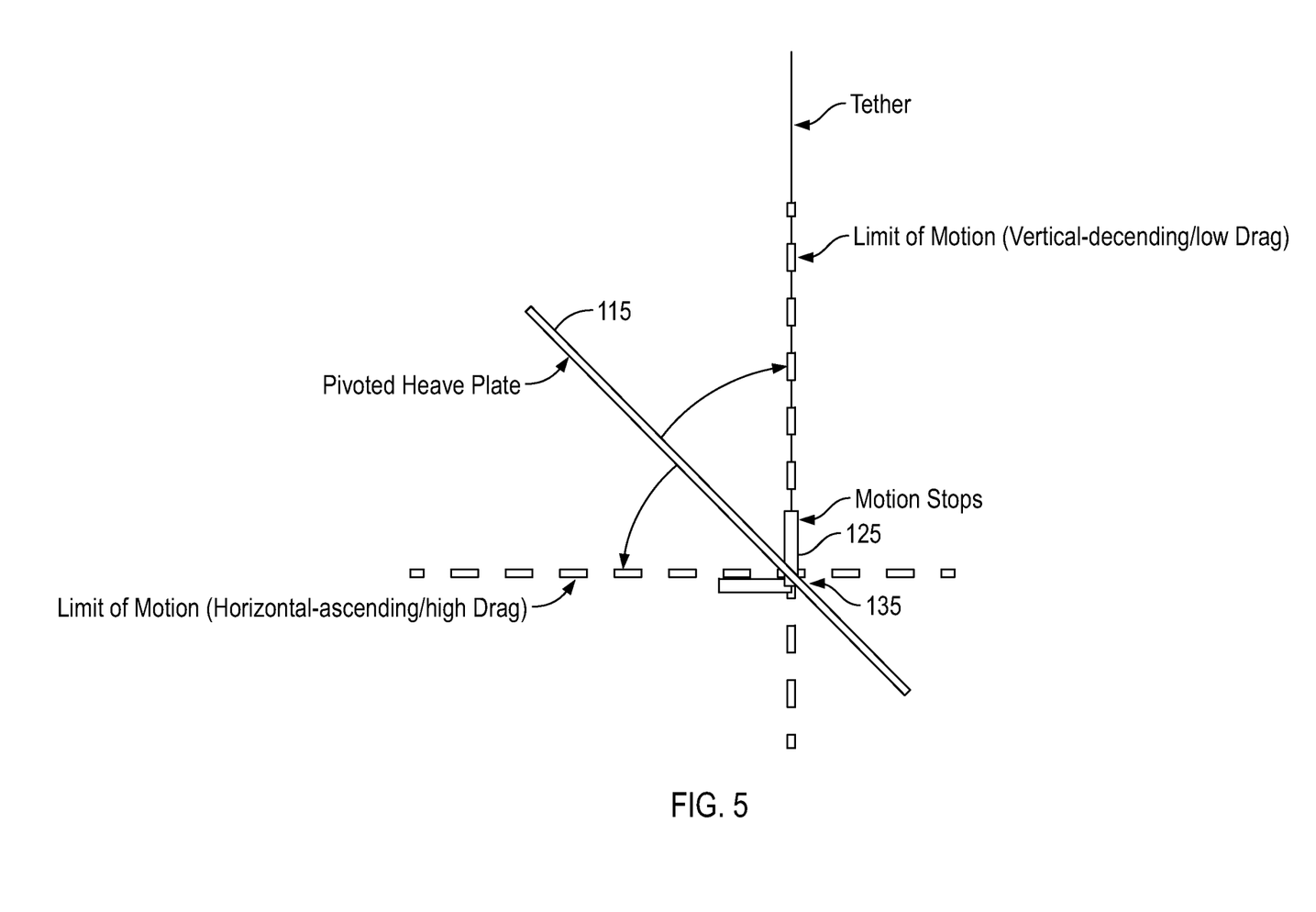
FIG. 5 shows a schematic of still yet another ballast system design of these teachings.

In one embodiment, as generally described above, the number of check valves are implemented by a number of covering plates 65. each covering plate 65 configured to be disposed inside one opening 55 from the number of openings and operatively attached off-center inside the opening with a movable joint (See joint structures in FIG. 5). Motion stops for each covering plate configured to position each covering plate to allow fluid flow between below the lower portion of the structure and above the upper portion of the structure when the structure is moving downward in the water column and to substantially prevent fluid flow between below the lower portion of the structure and above the upper portion of the structure when the structure is moving upwards in the water column. An instance of that embodiment is shown in FIGS. 2a-2b. FIGS. 2a-2b shows a schematic of a ballast system design, as described hereinabove. Different configurations are shown on ascent and descent. Walls provide additional drag on ascent (when openings are blocked) due to added mass of the water trapped within the limits of the device.

The embodiment shown in FIGS. 2a-2b includes a single horizontal frame, with one or more rectangular openings.

Each opening is covered by a plate mounted off center on a hinge, and limited to 90 degrees of motion. By aligning the motion stops appropriately, the moment associated with the drag force on each plate would result in each plate positioning itself substantially vertically on descent, minimizing drag, and substantially horizontally on ascent, maximizing drag.

Creating a ducted, or shrouded, approach above the grid would further increase drag due to added mass during ascent.

Yet another embodiment of the flexible component and ballast combination includes a hinged/umbrella-like device at the end of the line, pointing upward. When descending, the umbrella would close, providing minimal drag. When ascending, the umbrella would open, thus providing maximal drag.

In one embodiment, the ballast subsystem comprises: a first elongate member having a first and second end; the first elongate member being operatively connected at the first end to the flexible linear component; and one or more second elongated members; each of the one or more second elongate members having a first end and a second end. The second end of each of the one or more second elongate member is operatively coupled to the first elongate member by a movable joint and movable relative to the first elongate member between a retracted position and an extended position. In both the retracted and extended positions, in each of the second elongate members, the first end of each of the second elongate members is disposed closer to the point absorber wave energy converter than the second end of said each of the second elongate members. Each of the second elongate members is configured to assume the retracted position when sinking in the water column and to assume the extended position when moving upward in the water column. In one instance, the first elongate member is a portion of the flexible component.

Referring to FIGS. 3A-3D, yet another embodiment of the flexible component and ballast combination includes a hinged/umbrella-like device 70 at the end of the line, pointing upward. When descending, the umbrella would close, providing minimal drag. When ascending, the umbrella would open, thus providing maximal drag.

Another embodiment of the flexible component and ballast combination includes the incorporation of "scales" onto the line itself, such that it moves easily in one direction but is resistant to motion in the opposite direction. Increased drag could be accomplished by increasing the length of line, or hanging multiple lines to the desired depth.

Figure 4:
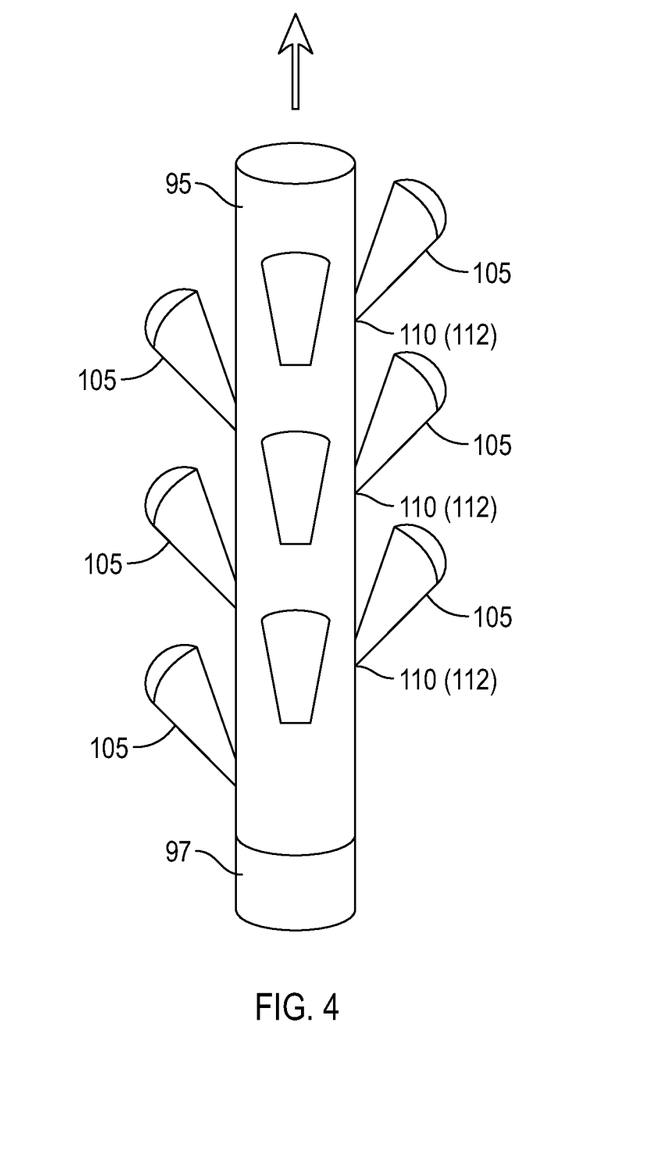
FIG. 4 shows a schematic of yet another ballast system design of these teachings.

Referring to FIG. 4, the ballast subsystem includes a first elongate structure 95 having a first and second end, the first elongate structure being operatively connected at the first end to the flexible linear component, a ballast weight 97 being operatively connected to the second end of the first elongate structure 95 and a number of second elongated structures 105 ("scales"), each of the one or more second elongate structures having a first end and a second end, the second end of each of the second elongate structures being operatively coupled to the first elongate member at a position between the first and second ends of the first elongate structures by a movable joint. Each of the second elongate structures being movable relative to the first elongate structure between a retracted position and an extended position. In both the retracted and extended positions, in each of the second elongate structures, the first end of each of the second elongate structures is disposed closer to the point absorber wave energy converter than the second end of each of the second elongate structures. Each of the second elongate structures is configured to assume the retracted position when sinking in the water column and to assume the extended position when moving upward in the water column. In one instance, the first elongate structure is a portion of the flexible component. FIG. 4 shows a first elongate structure 95 with a number of second elongate structures 105 with one end attached to the first elongate structure 95. The second elongate structures 105 are shown in the extended position. In the embodiment shown, the first elongate structure 95 is a portion of the flexible component (tether).

In one instance of the embodiment shown in FIG. 4, the second elongate structures 105 are permanently attached, at predetermined locations 110 to the first elongate structure 95. The material of the second elongate structures 105 is selected such that each of the second elongate structures flexibly deforms to assume the retracted position when sinking in the water column and flexibly deforms to assume the extended position when moving upward in the water column. In another instance, the second elongate structures 105 are connected to the first elongate structure 95 by means of a movable joint 112.

A further embodiment of the flexible component and ballast combination includes a single heave plate, attached to the tether line off center, and limited to 90 degrees of motion. By suspending the heave plate off center, and aligning the motion stops appropriately, the moment associated with the drag force on the plate would result in the plate positioning itself substantially vertically on a descent (minimizing drag, particularly that associated with added mass), and substantially horizontally on ascent (maximizing drag).

In one embodiment, the ballast subsystem includes a heave plate operatively connected to the flexible component by a movable joint, a connection of the heave plate to the flexible component configured such that the heave plate assumes a retracted position when sinking in the water, the retracted position being substantially parallel to the flexible component, and assumes an extended position when moving upward in the water column, the extended position being substantially perpendicular to the flexible component, and two motion stops having one end substantially at the location of the movable joint; one motion stop being disposed along the flexible component, another motion stop being disposed perpendicular to the flexible component. The movable joint (hinge) is constructed with motion stops to allow only approximately 90 degrees of motion, from the plate oriented substantially parallel to the flexible component (tether line), to the plate oriented substantially at right angles to the tether line. The plate is balanced so that it assumes the substantially parallel position when descending, and the substantially at right angles position when ascending.

FIG. 5 shows an embodiment of the ballast subsystem including the heave plate 115 operatively connected to the flexible component (tether) by a movable joint (hinge) 135. Two motion stops 125 allow approximately 90° of motion. One motion stop is disposed along the flexible component (tether) and another motion stop is disposed perpendicular to the flexible component (tether).

In one or more embodiments, the flexible component and ballast combination are configured to provide a strong drag force when moving upward in a water column and a weak drag force when sinking in the water column by being configured to provide a strong drag force when tension in the flexible component is greater than a predetermined threshold value and a weak drag force when tension in the flexible component is at most equal to the predetermined threshold value.

In one embodiment, wherein the flexible line component includes a transducer providing a first signal proportional to force along the flexible line component, and an electronic component configured to provide a second signal indicative of whether force, in tension, along the flexible line component is greater than the predetermined threshold value. The ballast subsystem includes a structure substantially parallel to a midplane of the point absorber wave energy converter, and generally horizontal, where the structure has a number of openings, each one of the number of openings disposed such that fluid can flow from below a lower portion of the structure towards the point absorber wave energy converter and from above an upper portion of the structure towards the lower portion of the structure, and a number of covering plates, each covering plate configured to be disposed inside one opening from the number of openings and operatively attached inside the opening with a movable joint (hinge), and a number of motion actuators configured to receive the second signal, each one of the number of motion actuators operatively connected to each one of the number of covering plates. Motion actuators, as used herein, includes motors, stepper motors and lead screws, motors and position actuators. Each one of the number of motion actuators is configured to position each one of the number of covering plates to allow fluid flow between the lower portion of the structure and above the upper portion of the structure when force, in tension, along the flexible line component is at most equal to the predetermined threshold value, and to position each one of the number of covering plates to substantially prevent fluid flow between the lower portion of the structure and above the upper portion of the structure when force, in tension, along the flexible line component is greater than the predetermined threshold value. An example of this embodiment shown in FIG. 6.

Figure 6:
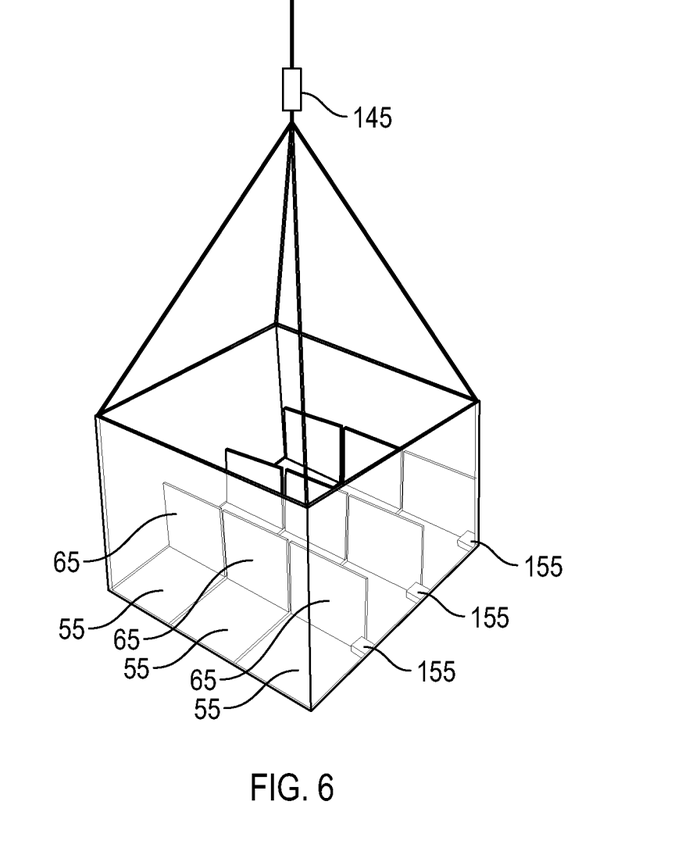
FIG. 6 shows a schematic of a flexible component and ballast system design of these teachings.

Referring to FIG. 6, in the embodiment shown therein, the flexible line component includes a transducer and the electronic component (load cell/PLC) 145 providing a signal indicative of whether force, in tension, along the flexible line component is greater than the predetermined threshold value to the motion actuators 155. The ballast subsystem includes a structure substantially parallel to a midplane of the point absorber wave energy converter, and generally horizontal, where the structure has a number of openings 55, each one of the number of openings disposed such that fluid can flow from below a lower portion of the structure towards the point absorber wave energy converter and from above an upper portion of the structure towards the lower portion of the structure, and a number of covering plates 65, each covering plate 65 configured to be disposed inside one opening from the number of openings and operatively attached inside the opening with a movable joint (hinge), and a number of motion actuators 155. The structure in FIG. 6 also includes one or more vertical walls substantially perpendicular to the substantially horizontal structure.

Figure 7:
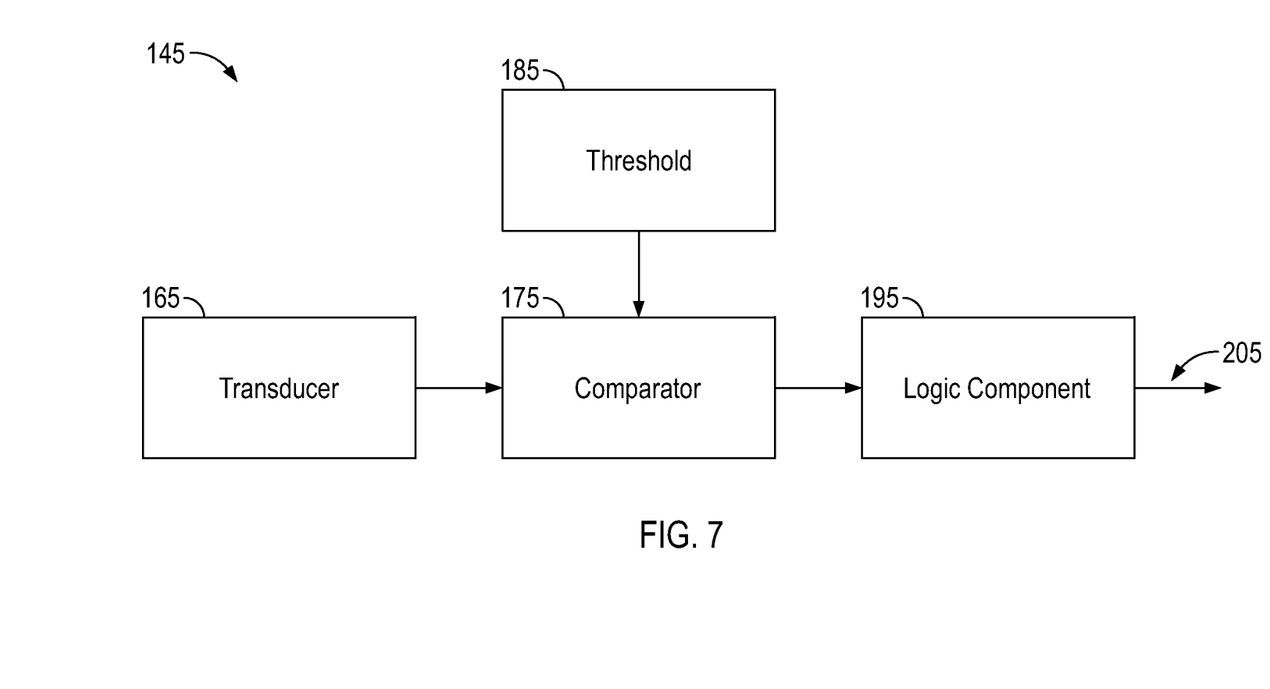
FIG. 7 shows a block diagram representation of one component of the embodiment of FIG. 6.

The electronic component can be an analog electronic component or a digital electronic component or a combination of the two. A block diagram of one embodiment of the electronic component is shown in FIG. 7. Referring to FIG. 7, in the embodiment shown therein, the electronic component receives a signal from a transducer 165 at a comparator 175, wherein the comparator also receives a threshold signal 185. The output of the comparator is provided to a logic component 195, wherein the logic component 195 provides a signal 205 that is provided to the motion actuators. A block diagram of another embodiment of the electronic component is shown in FIG. 7A.

Figure 7A:
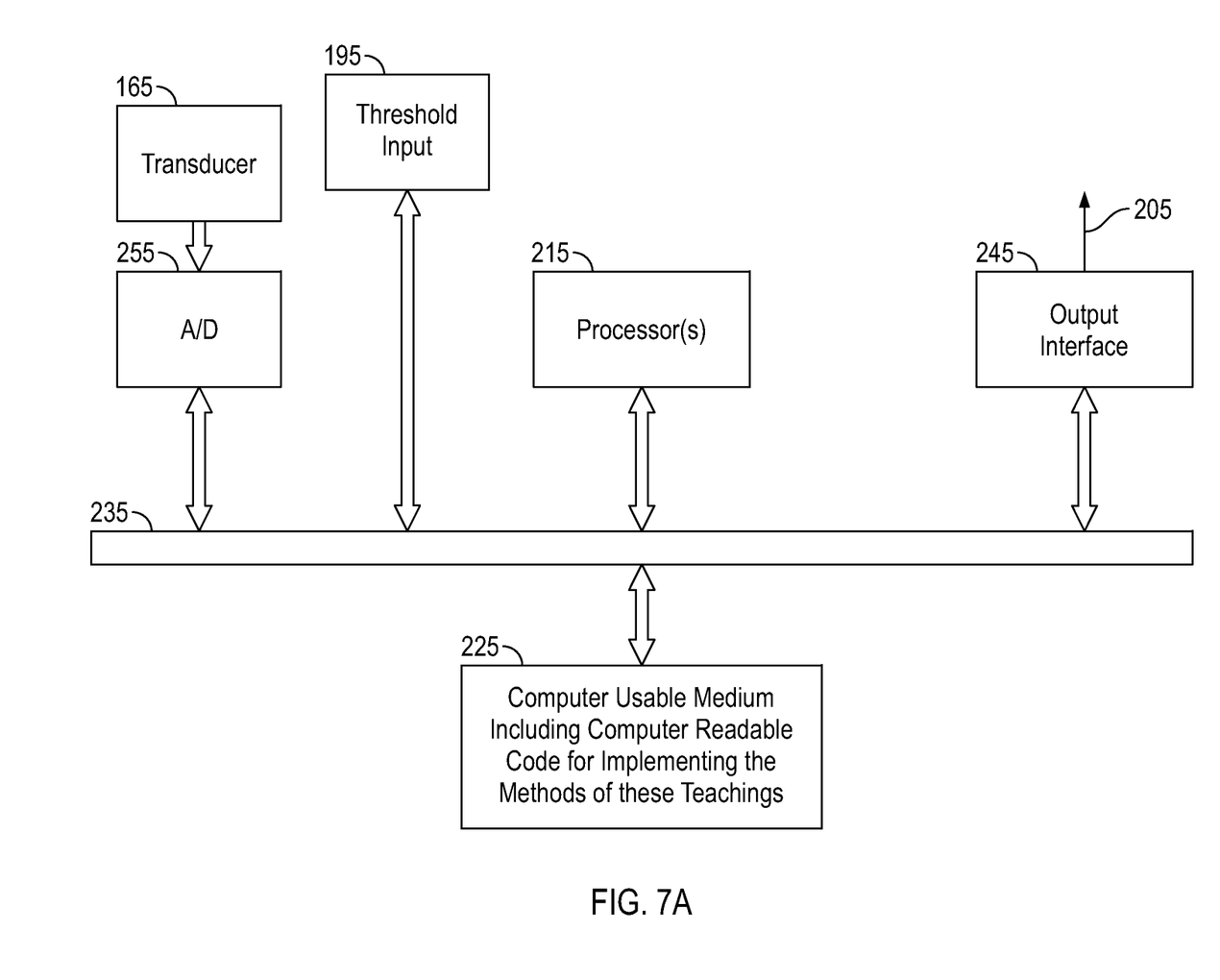
FIG. 7A shows another block diagram representation of one component of the embodiment of FIG. 6.

Referring to FIG. 7A, in the embodiment shown there in, a transducer 165 provides signal to an A/D converter 255 that is provided to the processor 215. The threshold 185 is also provided to the processor. Computer usable media 225 as computer readable code that causes a processor to determine whether the tension indicated by the signal from the transducer 165 is greater than the threshold 85, and causes the processor to provide a signal 205 indicative of whether force, in tension, along the flexible line component is greater than the predetermined threshold value. The A/D, the threshold input, the processor(s), the computer readable media and the output interface 245 are all operatively connected by a computer bus 235.

In another embodiment, the ballast subsystem includes a structure having at least one section substantially parallel to a midplane of the point absorber wave energy converter, and generally horizontal, vertical walls substantially perpendicular to the at least one section, an opening in at least one section, the opening extending from a location proximate to a first location in the at least one section to a location proximate to one of the vertical walls, a covering plate in each at least one section, the covering plate attached to the at least one section at the first location by a movable joint, a torsional spring configured to position the covering plate in order to allow fluid flow between below a lower portion of the structure and above an upper portion of the structure (a torsional spring, as used herein, is a dynamic element used to apply a torque or store rotational energy; a torsional spring can include one or more of a mechanical spring, magnetic elements that produce a field that generates a torque and other electro-mechanical systems that generate a torque), another opening in each of the at least one section; the flexible component being attached to the covering plate through the other opening at a second location between the first location and a point in the covering plate closest to another vertical wall, the second location being such that tension in the flexible component produces a moment at a location of the movable joint opposite a moment of the torsional spring, the second location selected such that when tension in the flexible component is greater than the predetermined threshold value, a resulting moment positions the covering plate to substantially prevent fluid flow between the lower portion of the structure and above the upper portion of the structure. Each covering plate allowed to pivot around a pinned connection. Each covering plate is operatively attached to the flexible component (tethering line) (directly or through a harnessing system) at a point that is located some distance away from the pivot point (movable joint), resulting in a moment around the pivot point when tension is applied to the tethering line. Each covering plate is assembled with a torsional spring providing a specified moment to keep the covering plate in a substantially vertical, or open position. When tension applied to the tethering line creates a moment around the pivot point that exceeds the moment provided by the spring or other mechanical mechanism the covering plate will move to the closed (high drag) position. One instance of the above embodiments is shown in FIG. 8.

Figure 8:
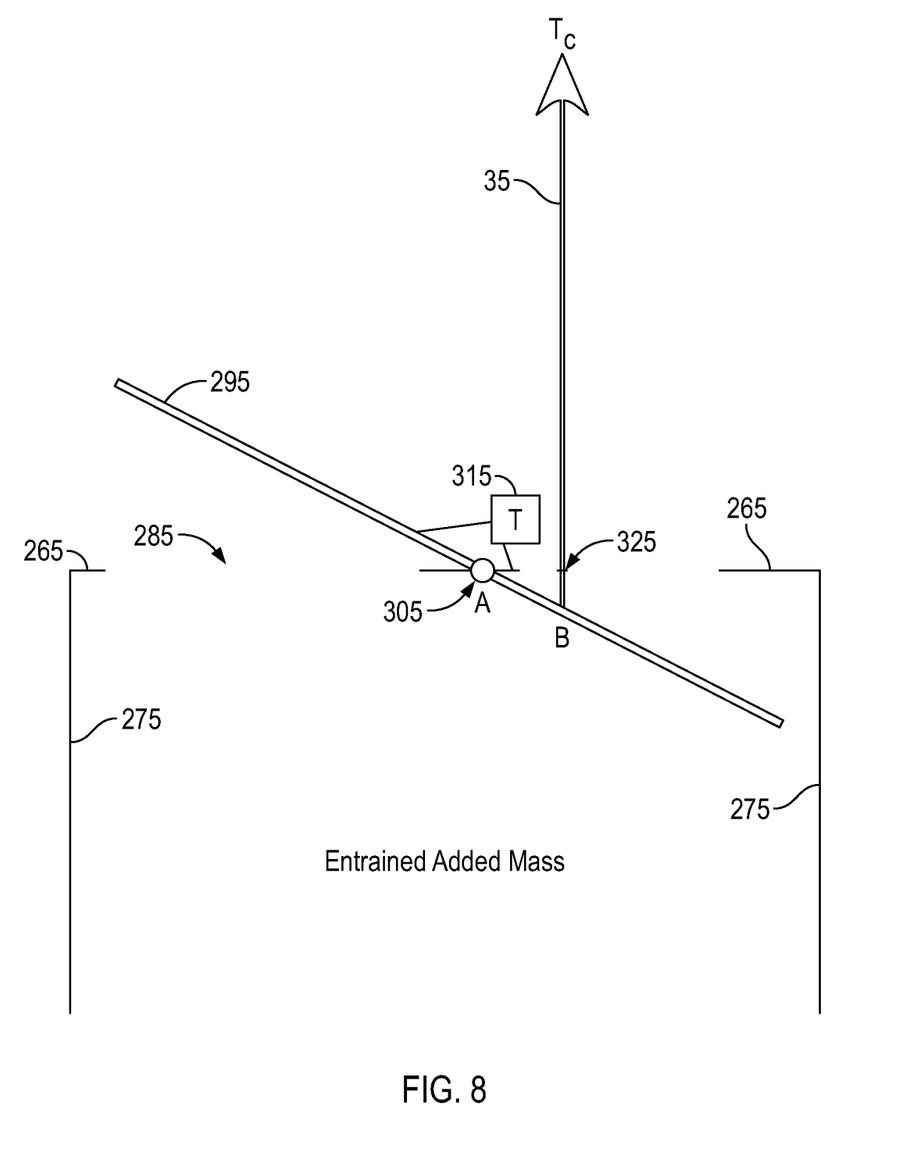
FIG. 8 shows another schematic of a flexible component and ballast system design of these teachings.

Referring to FIG. 8, in the embodiment shown there in, the ballast subsystem includes a structure having at least one section 265 substantially parallel to a midplane of the point absorber wave energy converter, and generally horizontal and vertical walls 275 substantially perpendicular to the at least one section 265. The at least one section 265 has a first opening 285, the first opening 285 extending from a location proximate to a first location (A) in the at least one section 265 to a location proximate to one of the vertical walls 275.

A covering plate 295 these attached to the at least one section 265 at the first location (A) by a movable joint 305. A torsional spring 315 is configured to position the covering plate in order to allow fluid flow between below a lower portion of the structure and above an upper portion of the structure. The at least one section 265 has a second opening 325. The flexible linear component 35 is attached to the covering plate 295 through the second opening 325 at a second location (B) between the first location (A) and a point in the covering plate closest to another vertical wall 275, the second location being such that tension in the flexible linear component produces a moment at a location of the movable joint opposite a moment of the torsional spring. In some instances, it is desirable to minimize the distance between the first location (A) and the second location (B) in order to enhance stability of the point absorber wave energy converter at the surface, and the vertical distance required for the tether 35 to move to fully close the covering plate 295. The second location selected such that when tension in the flexible component is greater than the predetermined threshold value, a resulting moment positions the covering plate to substantially prevent fluid flow between the lower portion of the structure and above the upper portion of the structure.

In one or more embodiments, the method of these teachings includes providing a flexible component extending from a point absorber wave energy converter to a ballast subsystem and operatively connected at one end to the ballast subsystem and at another end to the point absorber wave energy converter, and configuring the flexible component and ballast combination in order to provide a strong drag force when moving upward in a water column and a weak drag force when sinking in the water column.

In one or more other embodiments, the method of these teachings includes providing a flexible component extending from a point absorber wave energy converter to a ballast subsystem and operatively connected at one end to the ballast subsystem and at another end to the point absorber wave energy converter, and configuring the flexible component and ballast combination to provide a strong drag force when tension in the flexible component is greater than a predetermined threshold value and a weak drag force when tension in the flexible component is less than the predetermined threshold value.

It should be noted that embodiments of the method of these teachings that use the embodiments of the flexible component and ballast subsystem disclosed hereinabove are also within the scope of these teachings.

In one instance, not a limitation of these teachings, the point absorber wave energy converter is the point absorber wave energy converter disclosed in U.S. Publication No. US-2015-0275846, SYSTEMS AND METHODS FOR WAVE ENERGY CONVERSION, which is incorporated by reference herein in its entirety and for all purposes.

A tangible machine readable (usable) medium can be used to store software and data that, when executed by a computing device, causes the computing device to perform a method(s) as may be recited in one or more accompanying claims defining the disclosed subject matter. The tangible machine readable medium may include storage of the executable software program code/instructions and data in various tangible locations, including for example ROM, volatile RAM, non-volatile memory and/or cache. Portions of this program software code/instructions and/or data may be stored in any one of these storage devices. Further, the program software code/instructions can be obtained from remote storage, including, e.g., through centralized servers or peer to peer networks and the like. Different portions of the software program code/instructions and data can be obtained at different times and in different communication sessions or in a same communication session.

Tangible computer-readable (usable) media may include but are not limited to recordable and non-recordable type media such as volatile and non-volatile memory devices, such as volatile RAM (Random Access Memory), typically implemented as dynamic RAM (DRAM) which requires power continually in order to refresh or maintain the data in the memory, and non-volatile ROM (Read Only Memory), and other types of non-volatile memory, such as a hard drive, flash memory, detachable memory stick, etc. Non-volatile memory typically may include a magnetic hard drive, a magnetic optical drive, or an optical drive (e.g., a DVD RAM, a CD ROM, a DVD or a CD), or 'other type of memory system which maintains data even after power is removed from the system.

For the purposes of describing and defining the present teachings, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Although the teachings have been described with respect to various embodiments, it should be realized these teachings are also capable of a wide variety of further and other embodiments within the spirit and scope of the appended claims.

What is claimed is:

1. A tethered ballast system for a point absorber wave energy converter, the system comprising:
 a point absorber wave energy converter; and
 a flexible component and ballast combination comprising:
 a ballast subsystem including a hinged plate structure movable between an extended or closed position substantially parallel to a midplane of the point absorber wave energy converter and a retracted or open position substantially perpendicular to a midplane of the point absorber wave energy converter; and
 a flexible linear component extending from the point absorber wave energy converter to the ballast subsystem and operatively connected at one end to the ballast subsystem and at another end to the point absorber wave energy converter;
 the flexible component and ballast combination configured to provide a strong drag force when moving upward in a water column and said hinged plate structure is in said closed position and a weak drag force when sinking in the water column and said hinged check valve structure is in said open position,
 said hinged plate structure including a limit stop preventing said hinged plate structure from moving to an open position when moving upward in said water column.

2. The system of claim 1 wherein the ballast subsystem comprises a structure substantially parallel to a midplane of the point absorber wave energy converter, and generally horizontal, the structure comprising:
 a number of openings; each one of the number of openings disposed such that fluid can flow through the respective opening; and
 said hinged plate structure comprising a number of hinged covering plates; each covering plate configured to be disposed inside one opening from the number of openings and operatively attached off-center inside the one opening with a movable joint; motion stops for said each covering plate configured to position said each covering plate to allow fluid flow between below the lower portion of the structure and above the upper portion of the structure when the structure is moving downward in the water column and to substantially prevents fluid flow between below the lower portion of the structure and above the upper portion of the structure when the structure is moving upwards in the water column, in order to keep the flexible linear component under tension during a majority of a wave cycle.

3. The system of claim 2 wherein the structure further comprises one or more vertical walls substantially perpendicular to the structure substantially parallel to the midplane of the point absorber wave energy converter.

4. The system of claim 1 wherein the ballast subsystem further comprises:
- a first elongate member having a first and second end; the first elongate member being operatively connected at the first end to the flexible linear component; and
- wherein said hinged plate structure comprises one or more second elongated members; each of the one or more second elongate members having a first end and a second end; the second end of each of the one or more second elongate member being operatively coupled to the first elongate member by a movable joint and movable relative to the first elongate member between a retracted position and an extended position; in both the retracted and extended positions, in each of the second elongate members, the first end of each of the second elongate members is disposed closer to the point absorber wave energy converter than the second end of said each of the second elongate members; said each of the second elongate members being configured to assume the retracted position when sinking in the water column and to assume the extended position when moving upward in the water column.

5. The system of claim 4 wherein the first elongate member is a portion of the flexible linear component.

6. The system of claim 1 wherein the ballast subsystem comprises:
- a first elongate structure having a first and second end; the first elongate structure being operatively connected at the first end to the flexible linear component;
- a ballast weight being operatively connected to the second end of the first elongate structure; and
- wherein said hinged plate structure comprises a plurality of second elongated structures; each of the plurality second elongate structures having a first end and a second end; the second end of each of the second elongate structures being operatively coupled to the first elongate structure at a position between the first and second ends of the first elongate structures by a movable joint; said each of the second elongate structures being movable relative to the first elongate structure between a retracted position and an extended position; in both the retracted and extended positions, in said each of the second elongate structures, the first end of said each of the second elongate structures is disposed closer to the point absorber wave energy converter than the second end of said each of the second elongate structures; said each of the second elongate structures being configured to assume the retracted position when sinking in the water column and to assume the extended position when moving upward in the water column.

7. The system of claim 6 wherein the first elongate structure is a portion of the flexible linear component.

8. The system of claim 1 wherein the hinged plate structure comprises:
- a heave plate operatively connected to the flexible linear component by a movable joint; a connection of the heave plate to the flexible linear component configured such that the heave plate assumes a retracted position when sinking in water, the retracted position being substantially parallel to the flexible linear component, and assumes an extended position when moving upward in the water column, the extended position being substantially perpendicular to the flexible linear component; and
- two motion stops having one end substantially at a location of the movable joint; one motion stop being disposed along the flexible linear component, another motion stop being disposed perpendicular to the flexible component.

9. The system of claim 1 wherein the flexible component and ballast combination are configured to provide a strong drag force when moving upward in a water column and a weak drag force when sinking in the water column by being configured to provide a strong drag force when tension in the flexible linear component is greater than a predetermined threshold value and a weak drag force when tension in the flexible linear component is at most equal to the predetermined threshold value.

10. The system of claim 8 wherein the flexible linear component includes:
- a transducer providing a first signal proportional to force along the flexible linear component; and
- an electronic component configured to provide a second signal indicative of whether force, in tension, along the flexible linear component was greater than the predetermined threshold value;
- wherein the ballast subsystem comprises a structure substantially parallel to a midplane of the point absorber wave energy converter, and generally horizontal, the structure comprising:
  - a number of openings; each one of the number of openings disposed such that fluid can flow through the respective opening and wherein said hinged plate structure comprises a number of covering plates; each covering plate configured to be disposed inside one opening from the number of openings and operatively attached inside the one opening with a movable joint; and
  - a number of motion actuators configured to receive the second signal; each one of the number of motion actuators operatively connected to each one of the number of covering plates; said each one of the number of motion actuators configured to position said each one of the number of covering plates to allow fluid flow between the lower portion of the structure and above the upper portion of the structure when force, in tension, along the flexible linear component is at most equal to the predetermined threshold value, and to position said each one of the number of covering plates to substantially prevent fluid flow between the lower portion of the structure and above the upper portion of the structure when force, in tension, along the flexible linear component is greater than the predetermined threshold value.

11. The system of claim 10 wherein the structure further comprises one or more vertical walls substantially perpendicular to the structure substantially parallel to the midplane of the point absorber wave energy converter.

12. The system of claim 9 wherein the ballast subsystem comprises a structure having:
   at least one section substantially parallel to a midplane of the point absorber wave energy converter, and generally horizontal; vertical walls substantially perpendicular to said at least one section;
   an opening in each said at least one section, the opening extending from a location proximate to a first location in said at least one section to a location proximate to one of the vertical wall and wherein said hinged plate structure comprises a covering plate in each said at least one section; the covering plate attached to said at least one section at the first location by a movable joint;
   a torsional spring configured to position the covering plate in order to allow fluid flow between below a lower portion of the structure and above an upper portion of the structure; and
   another opening in each said at least one section; the flexible linear component being attached to the covering plate through said another opening at a second location between the first location and a point in the covering plate closest to another vertical wall; the second location being such that tension in the flexible linear component produces a moment at a location of the movable joint opposite a moment of the torsional spring; the second location selected such that when tension in the flexible linear component is greater than the predetermined threshold value, a resulting moment positions the covering plate to substantially prevent fluid flow between the lower portion of the structure and above the upper portion of the structure.

13. A method of providing ballast for a point absorber wave energy converter, the method comprising:
   providing a flexible linear component extending from a point absorber wave energy converter to a ballast subsystem and operatively connected at one end to the ballast subsystem and at another end to the point absorber wave energy converter, wherein the ballast subsystem comprises a structure substantially parallel to a midplane of the point absorber wave energy converter, the structure comprising:
   a number of openings, each one of the number of openings disposed such that fluid can flow through the respective opening;
   a number of covering plates, each covering plate configured to be disposed inside one opening from the number of openings and operatively attached inside the one opening with a movable joint for movement between a closed position and an open position; and
   one-way motion stops for said each covering plate configured to allow movement of the covering plates from the closed position to the open position and thereby allow fluid flow from below the structure to above the structure when the structure is moving downward in the water column and further configured to stop movement of the covering plates from the closed position and thereby prevent fluid flow from above the structure to below the structure when the structure is moving upwards in the water column, in order to keep the flexible linear component under tension during a majority of a wave cycle; and
   configuring said flexible linear component and ballast combination in order to provide a strong drag force when moving upward in a water column and a weak drag force when sinking in the water column.

14. The method of claim 13 wherein the ballast subsystem comprises:
   a first elongate member having a first and second end; the first elongate member being operatively connected at the first end to the flexible linear component; and
   one or more second elongated members; each of the one or more second elongate members having a first end and a second end; the second end of each of the one or more second elongate member being operatively coupled to the first elongate member by a movable joint and movable relative to the first elongate member between a retracted position and an extended position; in both the retracted and extended positions, in each of the second elongate members, the first end of each of the second elongate members is disposed closer to the point absorber wave energy converter than the second end of said each of the second elongate members; said each of the second elongate members being configured to assume the retracted position when sinking in the water column and to assume the extended position when moving upward in in the water column.

15. The method of claim 14 wherein the first elongate member is a portion of the flexible linear component.

16. A method of providing ballast for a point absorber wave energy converter, the method comprising:
   providing a flexible linear component extending from a point absorber wave energy converter to a ballast subsystem and operatively connected at one end to the ballast subsystem and at another end to the point absorber wave energy converter; and
   configuring a flexible component and ballast combination in order to provide a strong drag force when moving upward in a water column and a weak drag force when sinking in the water column,
   wherein the ballast subsystem comprises:
   a first elongate structure having a first and second end; the first elongate structure being operatively connected at the first end to the flexible linear component; a ballast weight being operatively connected to the second end of the first elongate structure; and
   a plurality of second elongated structures; each of the plurality second elongate structures having a first end and a second end; the second end of each of the second elongate structures being operatively coupled to the first elongate structure at a position between the first and second ends of the first elongate structures by a movable joint; said each of the second elongate structures being movable relative to the first elongate structure between a retracted position and an extended position; in both the retracted and extended positions, in said each of the second elongate structures, the first end of said each of the second elongate structures is disposed closer to the point absorber wave energy converter than the second end of said each of the second elongate structures; said each of the second elongate structures being configured to assume the retracted position when sinking in the water column and to assume the extended position when moving upward in the water column.

17. A method of providing ballast for a point absorber wave energy converter, the method comprising:
   providing a flexible linear component extending from a point absorber wave energy converter to a ballast subsystem and operatively connected at one end to the ballast subsystem and at another end to the point absorber wave energy converter; and configuring a flexible component and ballast combination in order to provide a strong drag force when moving upward in a water column and a weak drag force when sinking in the water column, wherein the ballast subsystem comprises:

a heave plate operatively connected to the flexible linear component by a movable joint; a connection of the heave plate to the flexible linear component configured such that the heave plate assumes a retracted position when sinking in water, the retracted position being substantially parallel to the flexible linear component, and assumes an extended position when moving upward in the water column, the extended position being substantially perpendicular to the flexible linear component; and two motion stops having one in substantially at a location of the movable joint; one motion stop being disposed along the flexible linear component, another motion stop being disposed perpendicular to the flexible linear component.

18. A method of providing ballast for a point absorber wave energy converter, the method comprising:

providing a flexible linear component extending from a point absorber wave energy converter to a ballast subsystem and operatively connected at one end to the ballast subsystem and at another end to the point absorber wave energy converter; and configuring a flexible component and ballast combination to provide a strong drag force when tension in the flexible linear component is greater than a predetermined threshold value and a weak drag force when tension in the flexible linear component is less than the predetermined threshold value.

19. The method of claim 18 wherein the flexible linear component includes:

a transducer providing a first signal proportional to force along the flexible linear component; and an electronic component configured to provide a second signal indicative of whether force, in tension, along the flexible linear component was greater than the predetermined threshold value;

wherein the ballast subsystem comprises a structure substantially parallel to a midplane of the point absorber wave energy converter, and generally horizontal, the structure comprising:

a number of openings; each one of the number of openings disposed such that fluid can flow through the respective opening;

a number of covering plates; each covering plate configured to be disposed inside one opening from the number of openings and operatively attached inside the one opening with a movable joint; and a number of motion actuators configured to receive the second signal; each one of the number of motion actuators operatively connected to each one of the number of covering plates; said each one of the number of motion actuators configured to position said each one of the number of covering plates to allow fluid flow between the lower portion of the structure and above the upper portion of the structure when force, in tension, along the flexible linear component is at most equal to the predetermined threshold value, and to position said each one of the number of covering plates to substantially prevent fluid flow between the lower portion of the structure and above the upper portion of the structure when force, in tension, along the flexible linear component is greater than the predetermined threshold value.

20. The method of claim 18 wherein the ballast subsystem comprises a structure having:

at least one section substantially parallel to a midplane of the point absorber wave energy converter, and generally horizontal; vertical walls substantially perpendicular to said at least one section;

an opening in each said at least one section, the opening extending from a location proximate to a first location in said at least one section to a location proximate to one of the vertical walls;

a covering plate in each said at least one section; the covering plate attached to said at least one section at the first location by a movable joint;

a torsional spring configured to position the covering plate in order to allow fluid flow between below a lower portion of the structure and above an upper portion of the structure;

and another opening in each said at least one section; the flexible linear component being attached to the covering plate through said another opening at a second location between the first location and a point in the covering plate closest to another vertical wall; the second location being such that tension in the flexible linear component produces a moment at a location of the movable joint opposite a moment of the torsional spring; the second location selected such that when tension in the flexible linear component is greater than the predetermined threshold value, a resulting moment positions the covering plate to substantially prevent fluid flow between the lower portion of the structure and above the upper portion of the structure.

* * * * *